United States Patent [19]

Xu

[11] Patent Number: 4,923,268

[45] Date of Patent: May 8, 1990

[54] FIBER OPTIC COUPLER

[75] Inventor: Jisen Xu, Milford, Mass.

[73] Assignee: Aster Corporation, Milford, Mass.

[21] Appl. No.: 257,856

[22] Filed: Oct. 14, 1988

Related U.S. Application Data

[63] Continuation-in-part of Ser. No. 96,547, Sep. 14, 1987, abandoned.

[51] Int. Cl.⁵ .............................................. G02B 6/26
[52] U.S. Cl. ................................ 350/96.15; 350/96.20
[58] Field of Search ................ 350/96.15, 96.16, 96.20, 350/96.21, 96.22

[56] References Cited

U.S. PATENT DOCUMENTS

| | | | |
|---|---|---|---|
| 4,264,126 | 4/1981 | Sheem | 350/96.15 |
| 4,291,940 | 9/1981 | Kawasaki et al. | 350/96.15 |
| 4,318,586 | 3/1982 | Coyne | 350/96.16 |
| 4,392,712 | 7/1983 | Ozeki | 350/96.16 |
| 4,439,221 | 3/1984 | Smyth et al. | 65/4.21 |
| 4,474,431 | 10/1984 | Bricheno | 350/96.15 |
| 4,586,784 | 5/1986 | Tremblay et al. | 350/96.15 |
| 4,591,372 | 5/1986 | Bricheno et al. | 65/4.2 |
| 4,593,968 | 6/1986 | Giallorenzi | 350/96.15 |
| 4,632,513 | 12/1986 | Stowe et al. | 350/320 |
| 4,681,400 | 7/1987 | Ueba et al. | 350/96.34 |
| 4,772,085 | 9/1988 | Moore et al. | 350/96.15 |
| 4,796,968 | 1/1989 | Coccoli et al. | 350/96.15 |
| 4,798,438 | 1/1989 | Moore et al. | 350/96.15 |
| 4,822,128 | 4/1989 | Imoto et al. | 350/96.16 |

FOREIGN PATENT DOCUMENTS

| | | |
|---|---|---|
| 2822022 | 12/1978 | Fed. Rep. of Germany . |
| 61-219011 | 9/1986 | Japan . |
| 62-210409 | 9/1987 | Japan . |
| 63-44607 | 2/1988 | Japan . |
| 8404822 | 12/1984 | PCT Int'l Appl. . |

OTHER PUBLICATIONS

Rawson et al., Electronics Letters, vol. 15, No. 14 (Jul. 5, 1979) pp. 432-433.
Imoto, et al., "Plastic Optical Fiber Star Coupler", Applied Optics, vol. 25, No. 19, Oct. 1, 1986, pp. 3443-3447.
Anthony A. Bioarski, "Low-Cost 1×2 Fiber Optic Coupler Using Plastic Fiber", SPIE, vol. 840, Fiber Optic Systems for Mobile Platforms, (1987) pp. 29-36.
Ohshima et al., "Small Loss-Deviation Tapered Fiber Star Coupler for LAN" Journal of Lightwave Technology, vol. Lt-3, No. 3, Jun. 1985, pp. 556-560.

Primary Examiner—John D. Lee
Attorney, Agent, or Firm—Fish & Richardson

[57] ABSTRACT

A fiber optic coupler and method for forming such coupler is shown in which the substance of the fibers is preselected to have a heat fusing temperature in a range achievable by exterior heating of a shrink sleeve, and the fibers are heat fused together along a limited length region within the shrunken sleeve as a result of heat and inter-fiber pressure applied to the fibers by exterior heating of the shrink sleeve. In preferred embodiments, a filler rod is disposed alongside the optical fibers and pressed thereagainst by the shrink sleeve, the exterior of the rod preferably of fluorocarbon plastic, having an index of refraction lower than the index of refraction of the fibers in the fused region. The interior of the filler rod preferably comprises an elongated heat transfer element having a heat transfer coefficient greatly exceeding the heat transfer coefficient of the fibers. A plastic coupler is also featured in which the cladding layer is completely absent in a fused region, and the cores in that region are deformed and fused together in a core-mode coupling relationship as the result of application of inter-fiber pressure under fusing conditions, preferably heat fusing conditions.

46 Claims, 6 Drawing Sheets

FIBER OPTIC COUPLER

This application is a continuation-in-part of U.S. Ser. No. 096,547, filed Sept. 14, 1987, and now abandoned.

Low cost optical fibers are very important in applications having very tight cost constraints, e.g., for medical sensors, automotive diagnostic applications and local area networks (LAN). An important component in such applications is a coupler capable of dividing light between two or more fibers. Plastic fiber (i.e. fiber comprised of synthetic resin) has high loss but is useful for applications over a relatively short distance, typically of the order of a few tens of meters in length. Plastic optical fibers typically have large core diameters running from about 240 to 1000 microns and can be used to carry a large amount of light.

Prior art fabrication techniques of plastic couplers include joining flat, polished surfaces of two fibers. Star couplers also have been made using plastic fibers, with clad fibers twisted together to create a coupler.

There is a need for improved techniques for forming couplers, especially for, but not limited to, plastic fibers.

SUMMARY OF THE INVENTION

According to one aspect of the invention, a plastic fiber optic coupler comprises at least two optical fibers joined in intimate contact by fusing along a limited length segment, each fiber, in the limited length segment, comprising a core and, disposed about the core, significantly less cladding material than in a region of each fiber outside the limited length segment, and disposed about the fibers along at least a portion of the limited length segment, a sleeve of shrink material treated to encircle the fibers in a manner to urge the fibers into intimate fused contact.

In preferred embodiments, the cladding is removed completely in the limited length segment to achieve core-mode coupling, preferably a limited amount of the core is also removed in the limited length segment; the fibers have a plastic cladding which is removed in the limited length segment by solvent, preferably the plastic cladding consists of fluoroalkyl acrylates and fluoroalkyl methacrylates and the solvent is acetone; the fibers are heat fused; and the sleeve is of material having a refractive index less than that of the cores of the plastic fibers.

According to another aspect of the invention, a method of forming an optical fiber coupler comprises the steps of: removing at least a portion of the cladding from limited length segments of two or more plastic optical fibers; disposing the limited length segments of at least the two fibers in close association within a sleeve of shrink material; and treating the sleeve and the limited length segments of the fibers to cause the sleeve to shrink in diameter to urge the fibers into intimate, fused, optically coupled relationship.

In preferred embodiments of the method, the fibers are joined by heat fusion, preferably fusion of the fibers occurs at the temperature of exterior heating the sleeve to cause it to shrink; the method further comprises providing a source of light at the end of one fiber and monitoring the output of light at the other end of one or more fibers to determine when the desired degree of coupling is achieved and discontinuing the exterior heating of the shrink tube in response thereto; the fibers are placed in close association by twisting, or by crossing the fibers, or the fibers, especially when there are more than about four fibers, are disposed in side-by-side, generally parallel relationship. The method further comprises disposing within the sleeve with the fibers, a rod of low index material for adjusting the volume about which the sleeve is caused to shrink, where heat shrink and fusing is employed, the rod preferably including a heat transfer element.

According to another aspect of the invention there is provided a fiber optic coupler and method for forming such coupler, by providing a plurality of optical fibers within a surrounding sleeve of heat shrink plastic in a shrunken state, each fiber having an optically transmissive core surrounded, along at least most of its length, by an optical cladding layer, this aspect of the invention characterized in that the substance of the fibers is preselected to have a heat fusing temperature in a range achievable by exterior heating of the shrink sleeve, and the fibers being heat fused together along a limited length region within the shrunken sleeve as a result of heat and inter-fiber pressure applied to the fibers by exterior heating of the shrink sleeve.

Preferred embodiments of this aspect of the invention have the following features. The optical fibers have a melting temperature below the melting temperature of the shrink plastic. The fibers are of plastic. The fibers are in a twisted-together state along their fused length. Over the fused length of the fibers, the fibers are comprised only of core material. At least one filler rod is disposed alongside the optical fibers and pressed thereagainst by the shrink sleeve. The exterior of the filler rod has an index of refraction lower than the index of refraction of the fibers in the fused region. At least the exterior of the filler rod comprises fluorocarbon plastic.

Preferred embodiments of this aspect of the invention also have the following features. The interior of the filler rod comprises an elongated heat transfer element having a heat transfer coefficient greatly exceeding the heat transfer coefficient of the fibers, the heat transfer element capable, during manufacture of the coupler, of distributing heat to the fibers in the fused region. More generally, there is disposed within the heat shrink tube, alongside the fibers, an elongated heat transfer element, the heat transfer element capable during manufacture of the coupler, of distributing heat to the fibers in the fused region. The elongated heat transfer element comprises a core comprised of metal, the core covered by a coating having an index of refraction less than the index of refraction of the fibers in the fused region. The heat transfer element comprises a length of copper wire, the wire having an exterior coating of fluorocarbon plastic. The optic fibers are twisted about themselves and the heat transfer element is substantially straight. There is a second heat shrink sleeve surrounding and in a shrunken state about the first mentioned sleeve. An exterior package is formed about the coupler, the exterior package including at least one stress-bearing rod outside of the shrink tube, constructed and arranged to resist bending stress applied to the coupler to limit stress applied to the fused region of the fibers.

Preferred embodiments of the method of this aspect of the invention also include the following features. The filler rod provided within the sleeve alongside the fibers is used during the heating of the sleeve to assist the sleeve in applying interfiber pressure between the fibers to facilitate the fusing of the fibers together in a coupling relationship over the limited length. The heat transfer element provided within the sleeve alongside the fibers, is used during the heating of the sleeve to distribute heat to facilitate the fusing of the fibers together in a coupling relationship over the limited length. Initially the fibers are completely stripped of the cladding layer in the region of the fibers to be fused, the heating step being effective to produce coupling of core modes between fibers.

According to another aspect of the invention, a fused fiber optic coupler is provided comprising a plurality of fibers, each fiber having an optically transmissive core surrounded, along at least most of its length, by an optical cladding layer, the fibers being fused together along a region of their length to provide optical coupling between the fibers, characterized in that the cores and the cladding layers of the optical fibers are comprised of plastic, the cladding layer being completely absent in the fused region, and the cores in that region being deformed and fused together in a core-mode coupling relationship as the result of application of inter-fiber pressure under fusing conditions.

Preferred embodiments of this aspect of the invention include the following features. The cores are comprised of a plastic selected from the class consisting of fusible acrylates and methacrylates that are capable of serving as optical fibers. The coupler includes pressing surfaces engaged upon the cores in the fused region, the pressing surfaces being defined by material having an index of refraction lower than that of the cores, preferably being comprised of fluorocarbon.

According also to the invention, a method is provided of forming a fused fiber optic coupler by fusing a plurality of fibers together along a region of their length to provide optical coupling between the fibers, characterized by the steps of providing optical fibers having cores and cladding layers comprised of plastic, completely removing the plastic cladding layers of each fiber in a region to be fused, placing the regions of the fibers alongside one another, and, under fusing conditions, applying pressure to deform and fuse the cores together in a core mode coupling relationship.

Preferred embodiments of this aspect of the invention include selecting cores of a plastic from the class consisting of fusible acrylates and methacrylates that are capable of serving as optical fibers and that the fusing conditions are provided by heating, and applying the heat and pressure by surfaces comprised of fluorocarbon.

These and other features and advantages of the invention will be understood from the following description of the presently preferred embodiment, and from the claims.

PREFERRED EMBODIMENT

We first briefly describe the drawings.

FIG. 1 is a perspective view of one embodiment of a coupler package including a plastic coupler of the invention; while

FIGS. 6 and 7 are side views of other embodiments of the plastic coupler of the invention, while

FIG. 12 is a cross-sectional view on an enlarged scale of a pair of twisted optical fibers, assembled with a heat transfer element prior to heating while

FIG. 13 is a cross-sectional view similar to FIG. 12A showing a fused fiber coupler while

Figure 1:
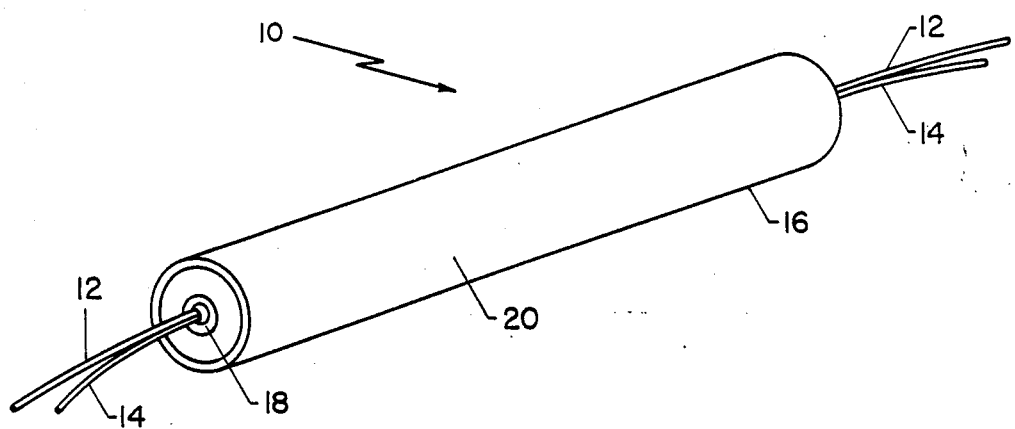
Figure 1A:
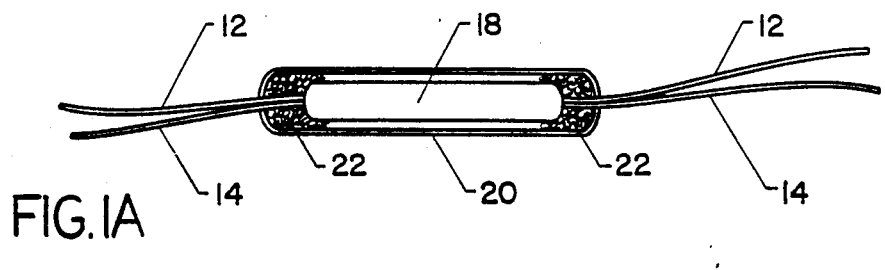
FIG. 1A is a somewhat diagrammatic side view thereof with the outer protective body broken away.

Referring to FIG. 1, an optical fiber unit 10 containing an optical coupler of the invention consists of at least two plastic optical fibers 12, 14 within a protective package 16 assembled about the fiber coupler. Referring to FIG. 1A, the protective package assembled about the fiber consists of an internal body, i.e., shrink tubing 18, an outer protective body which may be plastic, metal, or glass, e.g., a larger diameter tube 20, and intervening masses of relatively soft uniting material 22, e.g., epoxy, at each end.

Figure 2:
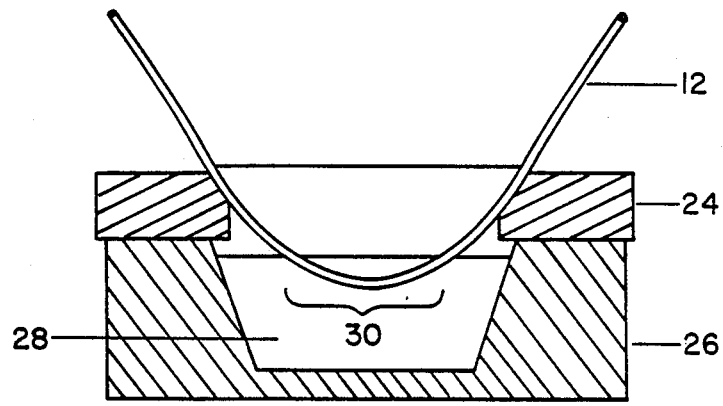
FIG. 2 is a side section view of one step of the coupler forming process.
Figure 3:
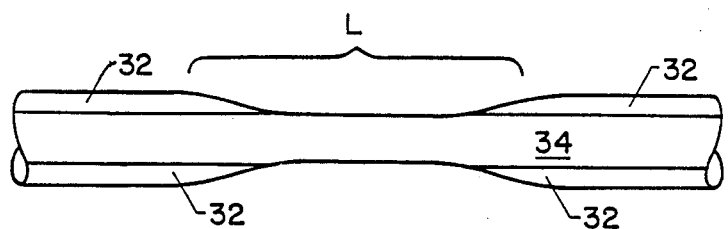
FIG. 3 is a side view of a plastic fiber prepared for use in forming the coupler of the invention.

The multi-mode plastic coupler of the invention is fabricated from plastic fibers having a large central core with slightly higher index of refraction than the surrounding thin cladding, e.g., of fluoroalkyl acrylate and fluoroalkyl methacrylate, e.g., fibers manufactured by Mitsubishi Corp. Referring to FIG. 2, a fiber 12 mounted in holder 24 is placed over container 26 holding a volume of suitable solvent 28, e.g., acetone. The fiber is mounted is such a fashion to cause the bowed segment 30 of the fiber to extend into the solvent. The fiber remains in the solvent until all or most all of the outer cladding layer 32 is removed over a limited length region, L (in certain cases, a small portion of the thickness of the core 34 may be removed as well, e.g., as shown in FIG. 3).

Figure 4:
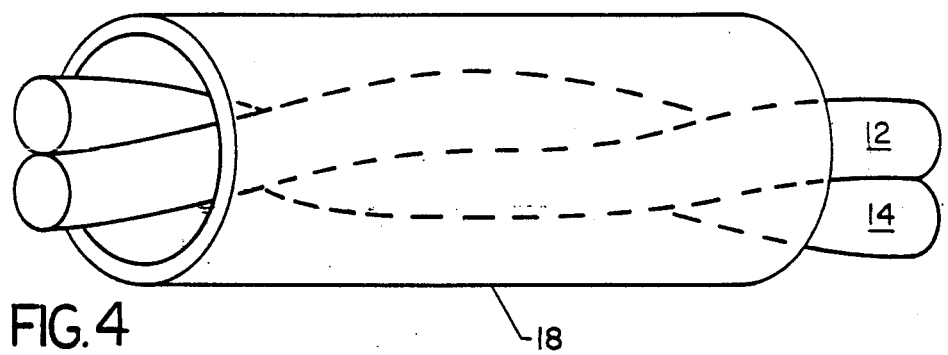
FIGS. 4 and 5 are somewhat diagrammatic views of further steps of the coupler forming process.

Referring to FIG. 4, two plastic fibers 12, 14, with at least a portion of the outer cladding removed (preferably the cladding has been removed entirely, and a small portion of the core has also been removed) are laid side by side and/or twisted together over one or more twists, with both ends of the fibers outside of the twisted region held in a fixture. A piece of shrink tubing 18, which extends beyond the cladding-removed segment of the fibers, and has the important property of having a refractive index that is less than that of the cores of the optical fibers, e.g., Teflon ®, a fluoropolymer sold by E.I. duPont de Nemours Company of Wilmington, Del., is placed over the corresponding limited length segments of the two fibers, and it may extend beyond the limited length segment. The low refractive index shrink tubing acts as an external cladding to the core in the limited length segment coupled region. (Shrink tubing with a higher refractive index can be used, but additional light loss will occur wherever the shrink tubing contacts the fiber cores.)

Figure 5:
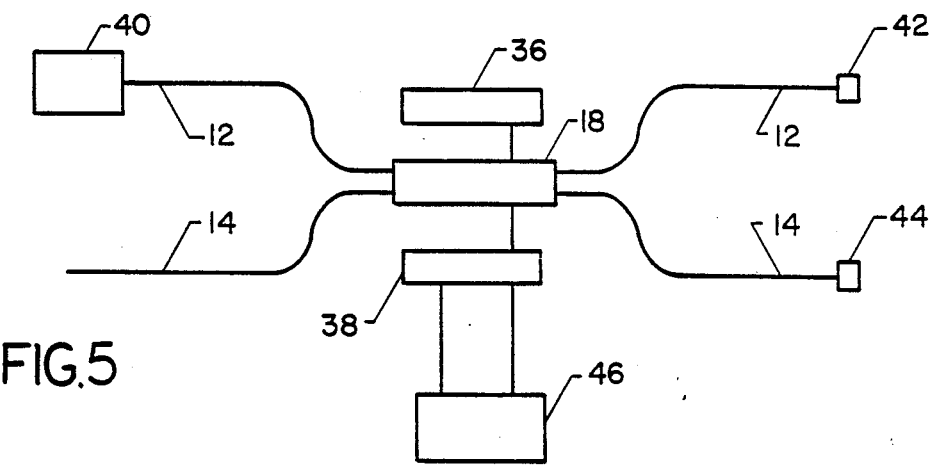

Referring now to FIG. 5, the fibers 12, 14 within shrink tubing 18 are mounted in a fixture between a pair of heater units 36, 38. One end of fiber 12 is connected to a source of light 40 while the opposite ends of fibers 12, 14 are connected to separate detector units 42, 44. Heaters 36, 38 are activated at controller 46 (two heaters are employed to provide more uniform heating) to cause the shrink tubing 18 to shrink about the fibers, urging the fibers into intimate contact while, at the same time, the fibers are heated to a sufficiently molten state to allow a degree of fusing to occur. By monitoring the level of light transmitted from source 40 to detectors 42, 44 via the coupled region, the heating process is continued until the desired degree of coupling has been achieved.

After the fibers have been properly fused together by the shrink tube, the entire assembly is encased in a suitable package, e.g., in the preferred embodiment, a larger piece of shrink or other tubing 20 (FIG. 1). The large piece of shrink tubing extends beyond the original shrink tubing 18 and, if desired, also out along the plastic fibers, beyond the limited length segment. This outermost shrink tubing encapsulation protects the fiber in the region where it has been somewhat reduced in diameter, and shields it from environmental influences. A convenient aspect of this external encapsulation is its flexibility which permits the coupler to be bent to conform to a desired shaped application, without seriously affecting the performance of the coupler.

Figure 6:
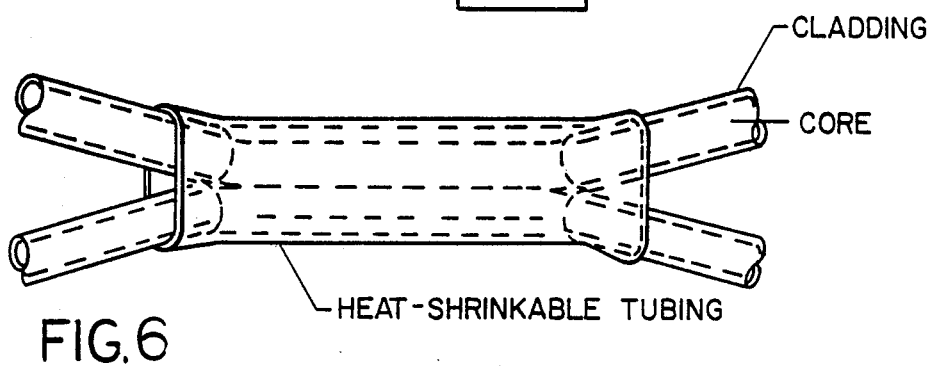
Figure 7:
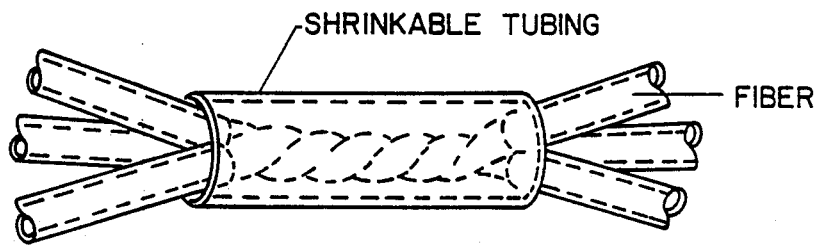

Other embodiments are possible. For example, if desired, the fibers may be heated to achieve a degree of preliminary fusion before the shrink tubing is placed about fibers and heated. This has particular application where there are employed fibers, e.g., glass fibers, in which too much heating would result in destruction of the shrink tubing material. The fibers may be joined in side-by-side relationship, without twisting (FIG. 6); the fibers may be crossed; or more than two fibers may be joined together, e.g., by twisting to form a star coupler (FIG. 7).

Figure 8:
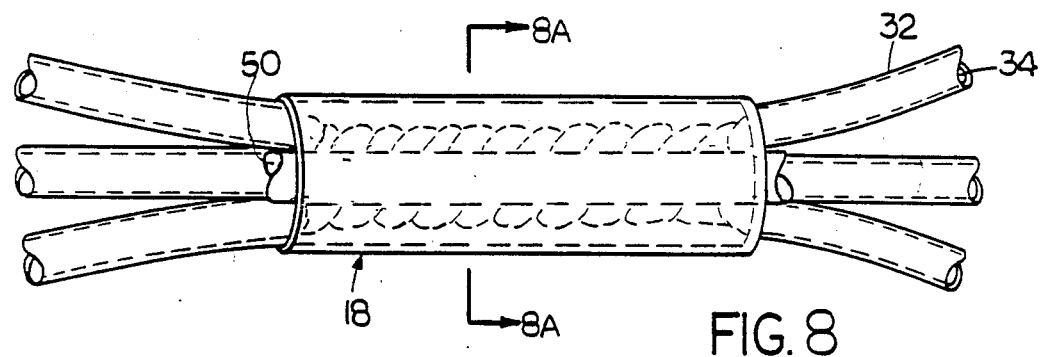
FIGS. 8 and 8A, and FIGS. 9 and 9A are side and end section views of still other embodiments of the plastic coupler.
Figure 8A:
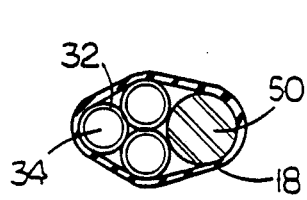
Figure 9A:
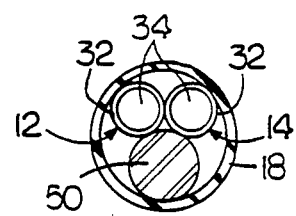
Figure 9:
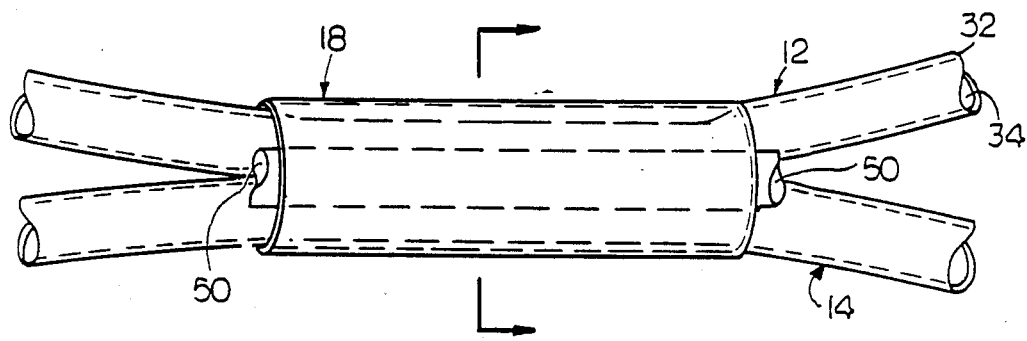

In some cases, where the diameter of the shrink tubing in its fully shrunk condition does not fully contact the fibers, there may be added one or more Teflon ® rods 50 to the interior of the shrink tubing to cause a composite of the shrink tubing plus rods to contact the optical fibers to cause the fibers to fuse together. The primary function of the Teflon ® rod is to create a size compatability between the diameter of the fibers and the inner diameter of the shrink tubing (e.g., in FIGS. 8 and 8A a three-fiber, twisted star coupler, and in FIGS. 9 and 9A a two-fiber, side-by-side coupler).

Figure 10:
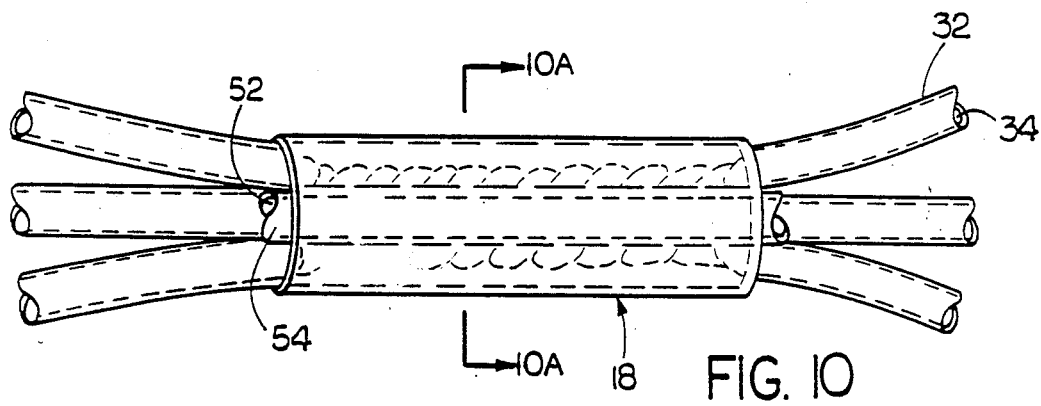
FIGS. 10, 10a and FIGS. 11, 11a are views similar to FIGS. 8, 8a and FIGS. 9, 9a, respectively, illustrating examples of use of a heat transfer element alongside the fibers in the coupler.
Figure 10A:
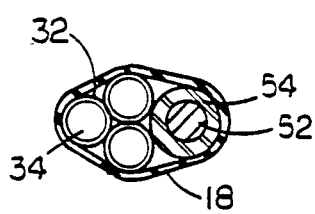
Figure 11A:
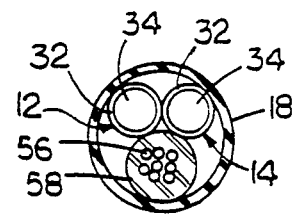
Figure 11:
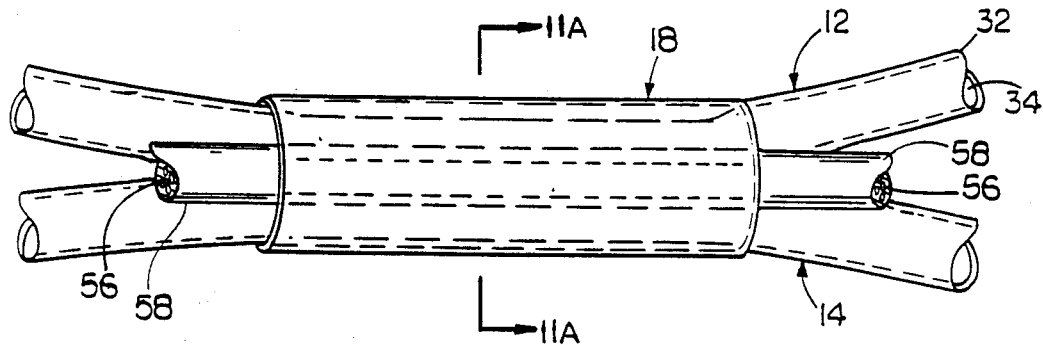

A further important function is achieved by incorporating within the body of the rod a heat transfer element effective to distribute heat longitudinally over the fused region to improve the uniformity of the heat-fusing action. Referring to FIG. 10 and 10a, the heat transfer element is in the form of a solid copper core 52, which carries an outer layer 54 of fluorocarbon (Teflon ®). The outer diameter may be, e.g., ½ millimeter while the outer layer may be of, e.g., 0.002 to 0.005 inch thickness. In the embodiment of FIGS. 11 and 11a, the heat transfer element is formed by a core 56 comprising a number of copper filaments twisted together, to which again a thin exterior layer 58 of fluorocarbon is applied. In each instance the fluorocarbon has an index of refraction of about 1.4, less than the index of the portions of the plastic fiber along which they lie.

During the heating action the heat transfer element can help to avoid over heated regions where the plastic fibers might be overheated and deformed too much, that might result in high light loss. Likewise the heat transfer element can help to avoid underheated regions where the deformation and fusing of the fibers together may be insufficient to provide the desired degree of coupling.

Figure 12:
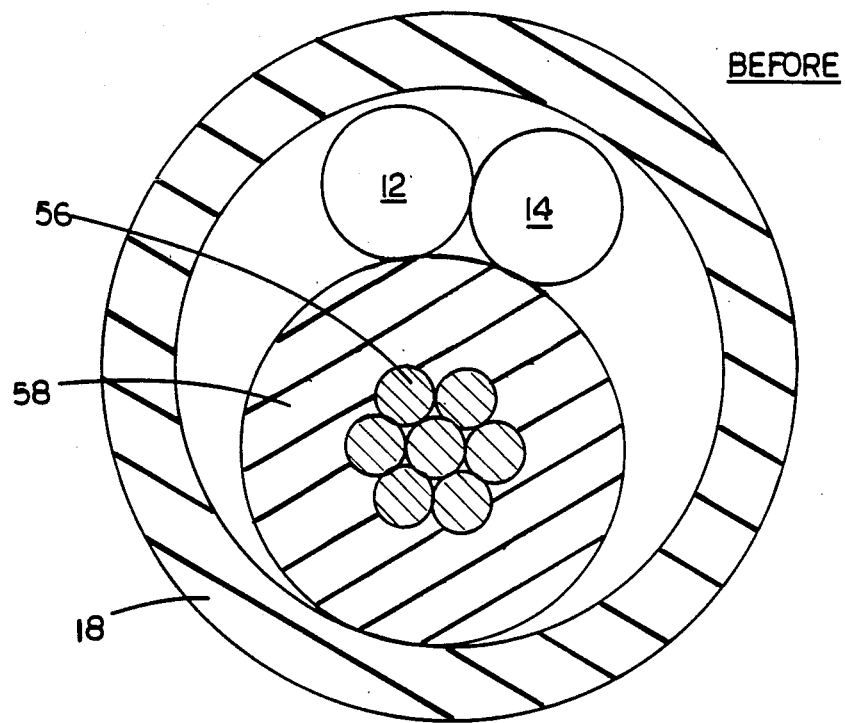

Referring to FIG. 12, plastic optical fibers 12, 14 are prepared as described with reference to FIG. 4, completely removing the clad in the region of shrink sleeve 18 and lightly twisted together. A space-filling rod comprised of a heat transfer core 56 and fluorocarbon exterior coating 58 (see FIG. 11 and 11a) is inserted within the sleeve, substantially filling the sleeve across from the fibers.

For instance, fibers 12 and 14 have an outer diameter of 250 micron (0.010 inch) with a 5 micron thick clad, available from Mitsubishi under trade designation EK10. (Other ESKA fibers from Mitsubishi may also be used, having cores of polymethylmethacrylate and a thin fluorine polymer as the clad, Mitsubishi's supra fibers can also be used.) The shrink tube is of Teflon ® fluorocarbon having an unshrunken outer diameter of 0.050 inch and inner diameter of 0.032 inch. The heat transfer element is copper wire coated with Teflon ® fluorocarbon, having an outer diameter of 0.021 inch.

Figure 12A:
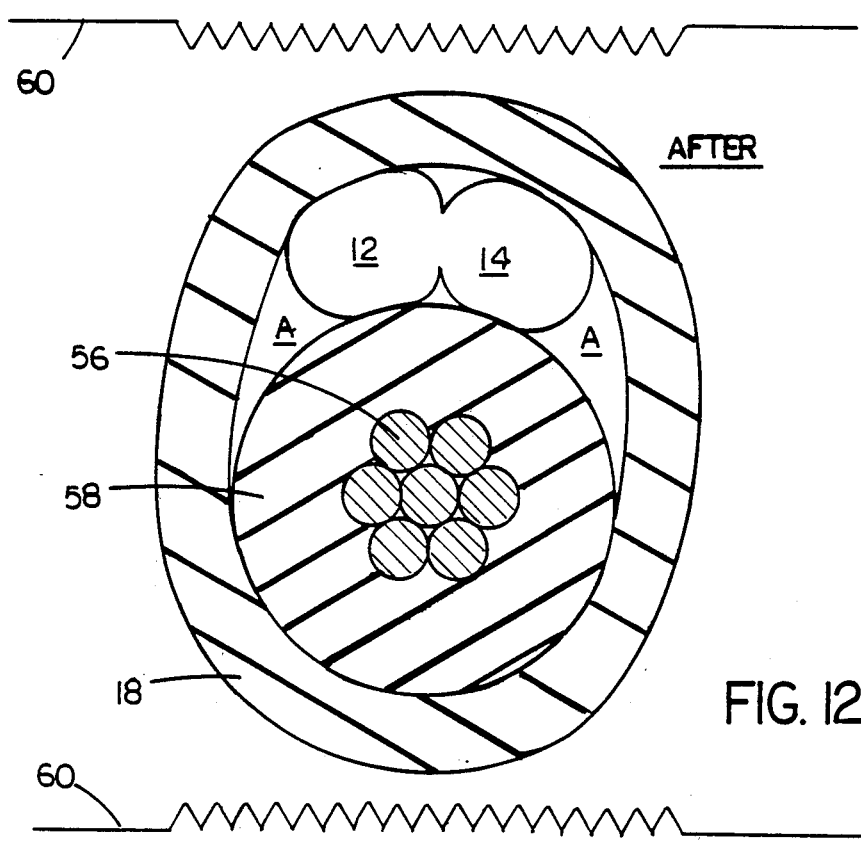
FIG. 12A illustrates the heating of the assembly and depicts details of the resulting contour of the fused fibers.

Referring to FIG. 12A, the assemblage is placed between a pair of electrical resistance heater 60 which shrink the shrink tube 18, squeezing the fibers between the wall of the shrink tube and the relatively rigid heat transfer element. This produces inter fiber pressure between the fibers. Heat transferred through the wall of the shrink sleeve, as well as heat distributed by the copper filament 56 causes the fibers to soften. This simultaneous heating and interfiber pressure causes the fibers to fuse together in a region of contact, producing core mode coupling between the fibers. This fused coupler has effective cladding. In the regions of respective contact the cladding is provided by the transparent fluorocarbon of the sleeve 18 and the coating 58 of the heat transfer member. Such fluorocarbon may have an index of refraction of about 1.4, less than that of the fused cores of the coupler, (and a shrink temperature of 175° C.).

For the substantial portions of the periphery of the fibers not in contact with the fluorocarbon, areas A, the air provides an effective cladding effect (referred to as air cladding).

Excellent mode mixing occurs as a result of the fiber deformation that accompanies the pressured fusing whereas excess deformation is avoidable to prevent excessive light loss.

Figure 13:
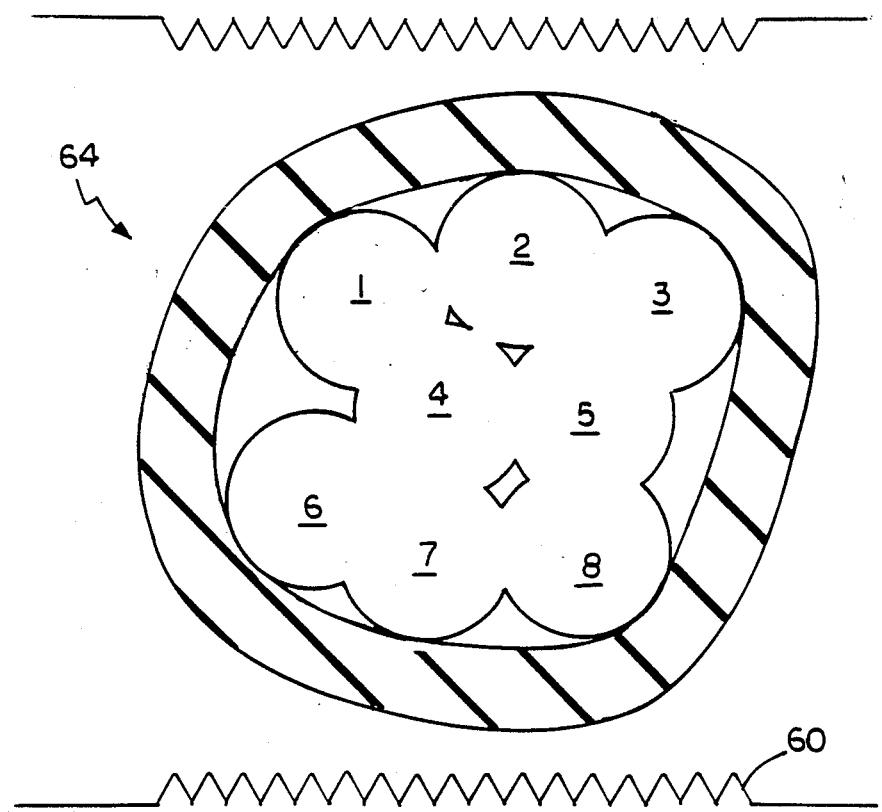

Referring to FIG. 13, a similar coupling having eight fibers 1-8 is shown in its fused state. To prepare for making this coupler, mutual segments of eight of the same plastic fibers as used for FIGS. 12 and 12A have their cladding removed, and the fibers gathered in a loose, unordered, bundle and inserted in a shrink sleeve 18. In this case the fibers substantially fill the cross-section of the unshrunken sleeve.

The assembly is then inserted between the heaters 60, causing the sleeve to shrink and the fibers to heat-fuse together substantially as shown, as a result of the inter fiber pressure produced by the shrinking of the tube and the fiber heating produced by heat conduction to the fibers across the wall thickness of the shrink sleeve.

It is observed that the fibers in the coupler are effectively coupled to a remarkable degree, despite the unequal areas of fusing that are produced. Note for instance that a number of the fibers, e.g. fibers 1 and 3 are fused to only two of the fibers in the assemblage, with unequal areas of fusing, while other fibers e.g. fibers 4 and 5 are fused to three or four fibers. A substantially smaller percentage of the circumference may be fused while still achieving acceptable coupling in many instances, in which case there can be less distortion of fibers and less light loss.

Figure 14:
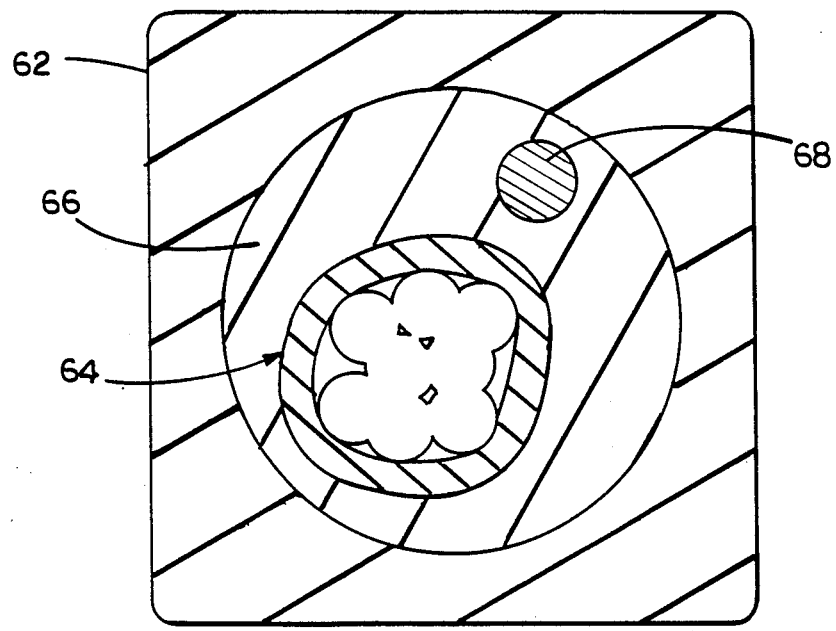
FIG. 14 shows, in cross-section, a fiber optic coupler package employing the coupler of FIG. 13.

Referring to FIG. 14, the coupler 64 of FIG. 13 is incorporated in a coupler package comprising an outer housing 62 of molded plastic, and potting material 66, e.g. epoxy, filling the space. A steel stress-bearing rod 68 disposed in the potting material within the housing, extending throughout the length of the coupler, serves to bear stress applied to the exterior of the package, thus protecting the coupler from excess stress and assuring uniform coupler action.

While heat-shrinking of the shrink sleeve and heat-fusing of the fibers is an extremely important feature of the invention, certain general principles of the invention are applicable more broadly. Shrink sleeves of materials that shrink under other conditions may be employed. For instance, it is known that certain tube-forming materials absorb large amounts of certain liquids and expand. Thus a tube might be employed which is temporarily expanded by absorption of a selected liquid, the fibers are then assembled within it, and the liquid may subsequently be removed to permanently shrink the tube about the fibers. Also fusing by means other than heat fusing may be employed. For instance using the just mentioned shrink sleeve, in situ removal of the clad and fusing of the cores of the fibers may be accomplished. For this purpose, after the fibers have been inserted in the shrink sleeve, but before the sleeve is shrunk by removal of the absorbed liquid, a solvent may be caused to flow through the sleeve, over the fibers, until the clad is removed in situ and the core is exposed and softened. Under such conditions the sleeve may then be shrunk by removal of its expanding liquid and the cores are bonded together by solvent bonding, under interfiber pressure produced by the shrinking sleeve.

While the fact that a plastic coupler can be simply made is an extremely important feature of the invention, certain of the general principles of the invention can be used to form couplers using other kinds of fibers. As an example, glass fibers having an extremely low melting point, below the melting point of the shrink sleeve, are possible As an example, there have been proposed high fluorine content special glass fibers, e.g. transparent in the far infrared, having melting points as low as 200° C. or lower. Fluorocarbon shrink sleeves having melt temperature in excess of 250° C., up to about 300° C., and initial shrink temperatures of e.g. 175° C. may be useful to achieve fused couplers with such glass fibers employing external heating of the sleeve, according to the invention.

Numerous other embodiments are possible within the claims.

I claim.

1. A fiber optic coupler formed of a plurality of optical fibers within a surrounding sleeve of heat shrink plastic in a shrunken state, each fiber having an optically transmissive core surrounded, along at least most of its length, by an optical cladding layer, characterized in that the substance of said fibers is preselected to have a heat fusing temperature in a range achievable by exterior heating of said shrink sleeve, said fibers being in a heat fused-together state along a limited length region within said shrunken sleeve as a result of heat and interfiber pressure applied to said fibers by exterior heating of said shrink sleeve.

2. The fused fiber optic coupler of claim 1 wherein said optical fibers have a melting temperature below the melting temperature of said shrink plastic, preferably the fibers being of plastic.

3. The fused fiber optic coupler of claim 1 or 2 wherein said fibers are in a twisted-together state along their fused length.

4. The fused fiber optic coupler of claim 1 in which, over the fused length of said fibers, said fibers are comprised only of core material.

5. The fused fiber optic coupler of claim 1 including at least one filler rod disposed alongside said optical fibers and pressed thereagainst by said shrink sleeve.

6. The fused fiber optic coupler of claim 5 wherein the exterior of said filler rod has an index of refraction lower then the index of refraction of said fibers in said fused region.

7. The fused fiber optic coupler of claim 6 wherein at least the exterior of said filler rod comprises fluorocarbon plastic.

8. The fused fiber optic coupler of claim 5 wherein the interior of said filler rod comprises an elongated heat transfer element having a heat transfer coefficient greatly exceeding the heat transfer coefficient of said fibers, said heat transfer element capable, during manufacture of said coupler, of distributing heat to said fibers in said fused region.

9. The fused fiber optic coupler of claim 8 wherein said optical fibers are twisted about themselves and said heat transfer element is substantially straight.

10. The fused fiber optic coupler of claim 1 in which there is disposed within said heat shrink sleeve, alongside said fibers, an elongated heat transfer element, said heat transfer element capable during manufacture of said coupler, of distributing heat to said fibers in said fused region.

11. The fused fiber optic coupler of claim 10 wherein said elongated heat transfer element comprises a core comprised of metal, said core covered by a coating having an index of refraction less than the index of refraction of said fibers in said fused region.

12. The fused fiber optic coupler of claim 11 wherein said heat transfer element comprises a length of copper wire, said wire having an exterior coating of fluorocarbon plastic.

13. The fused fiber optic coupler of claim 1 wherein said shrink sleeve is comprised of a material having an index of refraction lower than the index of refraction of said fibers in said fused region.

14. The fused fiber optic coupler of claim 13 wherein said shrink sleeve is comprised of fluorocarbon plastic.

15. The fiber optic coupler of claim 1 including a second heat shrink sleeve surrounding and in a shrunken state about said first mentioned sleeve.

16. The fused fiber optic coupler of claim 1 including an exterior package formed about said coupler, said exterior package including at least one stress-bearing rod outside of said shrink sleeve, constructed and arranged to resist bending stress applied to said coupler thereby to limit stress applied to the fused region of said fibers.

17. A method of forming a fiber optic coupler by means of shrinking a sleeve of heat shrink plastic about a plurality of optical fibers, each fiber having an optically transmissive core surrounded, along at least most of its length, by an optical cladding layer, characterized in that the substance of said fibers is preselected to have a heat fusing temperature in a range achievable by exterior heating of said shrink sleeve, said method including the steps of assembling said fibers in a coextensive relationship within said sleeve, and applying external heat to said sleeve sufficient to shrink said sleeve to apply interfiber pressure between said fibers while, through the substance of said sleeve, heating said fibers to said fusing temperature sufficient to cause said fibers to heat fuse together in a coupling relationship over a limited length region and thereafter allowing said assembly to cool.

18. The method of claim 17 characterized by the further step of providing a filler rod within said sleeve alongside said fibers, during the heating of said sleeve said rod assisting said sleeve in applying interfiber pressure between said fibers to facilitate the fusing of the fibers together in a coupling relationship over said limited length.

19. The method of claim 17 or 18 characterized by the step of providing a heat transfer element within said sleeve alongside said fibers, during the heating of said sleeve, said heat transfer element serving to distribute heat to facilitate the fusing of the fibers together in a coupling relationship over said limited length.

20. The method of claim 17 characterized in that there are less than about six of said fibers within said sleeve, including the step of twisting said fibers together prior to exterior heating of said sleeve to heatfuse said fibers.

21. The method of claim 17 characterized in that there are more than about four of said fibers within said sleeve, said fibers being in a generally straight, untwisted relationship within said sleeve at the time of heat shrinking said sleeve and heat-fusing said fibers, preferably the fibers being in core-mode coupling relationship to each other.

22. The method of claim 17 characterized by the step of initially completely stripping said fibers of said cladding layer in the region of said fibers to be fused, said heat-fusing of said fibers being effective to produce core mode coupling between fibers.

23. A fused fiber optic coupler comprising a plurality of fibers each fiber having an optically transmissive core surrounded, along at least most of its length, by an optical cladding layer, the fibers being fused together along a region of their length to provide optical coupling between the fibers, characterized in that the cores and the cladding layers of said optical fibers are comprised of plastic, the cladding layer being completely absent in said fused region, and the cores in said region being deformed in cross-sectional area in a core-mode coupling relationship as the result of simultaneous application of radial inter-fiber pressure and fusing conditions.

24. The fused fiber optic coupler of claim 23 characterized in that said cores are comprised of a plastic selected from the class consisting of fusible acrylates and methacrylates, that are capable of serving as optical fibers.

25. The fused fiber optic coupler of claim 23 or 24 characterized in that said coupler includes pressing surfaces engaged upon said cores in said fused region, said pressing surfaces being defined by material having an index of refraction lower than that of said cores.

26. The fused fiber optic coupler of claim 23 wherein said plastic is heat-fusible, the cores of said fibers are heat-fused together and said inter-fiber pressure is applied by pressing surfaces comprised of fluorocarbon which form a part of the coupler and are engaged upon said cores.

27. A fused fiber optic coupler comprising more than about four fiber optic fibers, each fiber having an optically transmissive core surrounded, along at least most of its length, by an optical cladding layer, the fibers, which extend along each other in a generally straight, untwisted relationship being fused together along a region of their length to provide optical coupling between the fibers, characterized in that the cores and the cladding layers of said optical fibers are comprised of plastic, the cladding layer being completely absent in said fused region, and the cores in said region being deformed and fused together in a core-mode coupling relationship to each other as the result of application of inter-fiber pressure throughout said region to be fused under fusing conditions.

28. A method of forming a fused fiber optic coupler by fusing a plurality of fibers together along a region of their length to provide optical coupling between the fibers, characterized by the steps of providing optical fibers having cores and cladding layers comprised of plastic, completely removing the plastic cladding layers of each fiber in a region to be fused, placing said regions of said fibers alongside one another, and, under fusing conditions, simultaneously applying radial inter-fiber pressure to deform said cores in cross-sectional shape and fuse said cores together in a core-mode coupling relationship without change in length or cross-sectional area.

29. The method of claim 28 in which said cores are selected of a plastic from the class consisting of fusible acrylates and methacrylates that are capable of serving as optical fibers.

30. The method of claim 28 or 29 characterized in that the fusing conditions are provided by heating and applying said heat and pressure by surfaces comprised of fluorocarbon.

31. A fiber optic coupler comprising at least two plastic optical fibers joined in intimate contact by fusing along a limited length segment,
   each said fiber, in said limited length segment, comprising a core and, disposed about said core, significantly less cladding material than in a region of each said fiber outside said limited length segment, and
   disposed about said fibers along at least a portion of said limited length segment, a sleeve of shrink material treated to encircle said fibers in a manner to urge said fibers into intimate fused contact.

32. The coupler of claim 31 wherein said sleeve is of material having a refractive index less than that of the cores of said fibers.

33. The coupler of claim 31 wherein said cladding is removed completely in said limited length segment.

34. The coupler of claim 33 wherein the entire cladding and a limited amount of the core is removed in said limited length segment.

35. The coupler of claim 31 wherein said fibers have a plastic cladding, and said cladding is removed in said limited length segment by solvent.

36. The coupler of claim 35 wherein said plastic cladding is one of the group of fluoroalkyl acrylates and fluoroalkyl methacrylates and said solvent is acetone.

37. The coupler of claim 31 wherein said fibers are heat fused.

38. A method of forming an optical fiber coupling for optical fibers, each fiber having an optically transmissive core surrounded, along at least most of its length, by an optical cladding layer comprising the steps of:
   removing at least a portion of the cladding from limited length segments of two or more plastic optical fibers;

disposing the limited length segments of at least two said fibers in close association within a sleeve of shrink material; and treating said sleeve and said limited length segments of said fibers to cause said sleeve to shrink in diameter to urge said fibers into intimate, fused, optically coupled relationship.

39. The method of claim 38 wherein said fibers are joined by heat fusion.

40. The method of claim 38 further comprising providing a source of light at the end of said fiber and monitoring the output of light at the other ends of one or more said fibers to determine when the desired degree of coupling is achieved and discontinuing said treatment of said shrink sleeve in response thereto.

41. The method of claim 38 wherein said fibers are placed in close association by twisting.

42. The method of claim 38 wherein said fibers are placed in close association by crossing the fibers.

43. The method of claim 38 wherein said fibers are disposed in side-by-side generally parallel relationship.

44. The method of claim 38 further comprising disposing within said sleeve with said fibers, a rod of low index material for adjusting the volume about which said sleeve is caused to shrink.

45. The method of claim 38 wherein said sleeve is shrunk and said fibers are fused by exterior heating of said shrink sleeve, and wherein said step of disposing the limited length segments of at least two said fibers in close association within a sleeve of shrink material further comprises disposing a rod which includes a heat transfer element which acts to distribute heat to the region being fused within said sleeve.

46. A method of forming an optical fiber coupler from plastic optical fibers each of said fibers having a core with cladding disposed thereabout comprising the steps of:

removing at least a portion of the cladding from a limited length segment of each of two or more plastic optical fibers;

disposing the limited length segments of at least two said fibers in close association within a sleeve of shrink material; and heating said sleeve and said limited length segments of said fibers to cause said sleeve to shrink in diameter to urge said fibers into intimate relationship and to heat fuse said fibers, wherein heat fusion of said fibers occurs at the temperature of heating said sleeve to cause it to shrink.

* * * * *

UNITED STATES PATENT AND TRADEMARK OFFICE
CERTIFICATE OF CORRECTION

PATENT NO. : 4,923,268

DATED : May 8, 1990

INVENTOR(S) : Jisen Xu

It is certified that error appears in the above-identified patent and that said Letters Patent is hereby corrected as shown below:

Column 2, line 18, after "fused" and before "together", insert a hyphen.

Column 3, line 39, after "core" and before "mode", insert a hyphen.

Column 5, line 59, after "over" and before "heated" insert a hyphen.

Column 6, line 18, "heater" should be -- heaters --.

Column 6, line 21, after "inter" and before "fiber" insert a hyphen.

Column 6, line 27, after "core" and before "mode" insert a hyphen.

Column 6, line 54 and 55 after "inter" and before "fiber" insert a hyphen.

Column 7, line 41, after "possible" insert a period.

In the Claims:

Column 8, claim 6, line 12, delete "then" and insert therefore -- than--.

Column 9, claim 20, line 23, delete "heatfuse" and insert therefore --heat-fuse--.

UNITED STATES PATENT AND TRADEMARK OFFICE
CERTIFICATE OF CORRECTION

PATENT NO. : 4,923,268

DATED : May 8, 1990

INVENTOR(S) : Jisen Xu

It is certified that error appears in the above-identified patent and that said Letters Patent is hereby corrected as shown below:

Column 9, claim 23, line 2, after "fibers" insert a comma.

Column 9, claim 23, line 46, after "cross-sectional" insert -- shape and fused together without change in length or cross-sectional --

Signed and Sealed this

Tenth Day of March, 1992

*Attest:*

HARRY F. MANBECK, JR.

*Attesting Officer*     *Commissioner of Patents and Trademarks*